US012648883B2

(12) United States Patent
(10) Patent No.: US 12,648,883 B2
(45) Date of Patent: Jun. 9, 2026

Liu et al.

(54) MOVING MACHINE

(71) Applicant: Xinzhiyuan Medical Equipment (Guangdong) Co., Ltd., Foshan (CN)

(72) Inventors: Zhongliang Liu, Foshan (CN); Mingze Liu, Foshan (CN); Yanfei Gao, Foshan (CN)

( * ) Notice: Subject to any disclaimer, the term of this patent is extended or adjusted under 35 U.S.C. 154(b) by 9 days.

(21) Appl. No.: 18/982,951

(22) Filed: Dec. 16, 2024

(65) Prior Publication Data

US 2026/0151281 A1 Jun. 4, 2026

(51) Int. Cl.

*A61G 5/10* (2006.01)
*A61G 5/12* (2006.01)
*A61G 7/10* (2006.01)

(52) U.S. Cl.

CPC ........... *A61G 5/1056* (2013.01); *A61G 5/125* (2016.11); *A61G 5/127* (2016.11); *A61G 5/128* (2016.11); *A61G 7/1017* (2013.01); *A61G 7/1019* (2013.01); *A61G 7/1046* (2013.01); *A61G 5/12* (2013.01); *A61G 7/1013* (2013.01)

(58) Field of Classification Search

CPC ...... A61G 5/1056; A61G 5/125; A61G 5/127; A61G 5/128; A61G 5/12; A61G 7/1046; A61G 7/1049; A61G 7/1059; A61G 7/104; A61G 7/1019; A61G 7/1017; A61G 7/1013

USPC ............................. 5/81.1 R, 83.1, 86.1, 87.1

See application file for complete search history.

(56) References Cited

U.S. PATENT DOCUMENTS

| | | | | | |
|---|---|---|---|---|---|
| 1,961,119 | A * | 5/1934 | Ettinger | ............... | A61G 7/1061 D24/188 |
| 2,821,406 | A * | 1/1958 | Hoyer et al. | ......... | A61G 7/1046 5/83.1 |
| 3,270,574 | A * | 9/1966 | Stewart et al. | ...... | A61G 7/1067 74/432 |
| 4,680,819 | A * | 7/1987 | James | .................. | A61G 7/1067 D34/33 |
| 4,703,523 | A * | 11/1987 | James | .................. | A61G 7/1017 D34/33 |
| 5,309,584 | A * | 5/1994 | Parker | .................. | A61G 7/1094 5/87.1 |

(Continued)

FOREIGN PATENT DOCUMENTS

| | | | | |
|---|---|---|---|---|
| CA | 2847460 A1 * | 6/2014 | ........... | A61G 7/1019 |
| CA | 2847460 C * | 2/2016 | ........... | A61G 7/1019 |

(Continued)

*Primary Examiner* — Robert G Santos

(57) ABSTRACT

A moving machine comprises a base, a support component, and boom components; the support component comprises a support column and a support frame, wherein the support column is connected to the base, and the support frame is connected to the support column; there are two boom components, and the two boom components are symmetrically disposed on the support frame; each boom component comprises a boom frame, a boom locking member, a seat cushion and a hand rest cushion; the boom frame is rotatably connected to the support frame, the boom locking member is movably connected to the boom frame, the boom locking member is used to restrict movement of the boom frame relative to the support frame, the seat cushion is connected to the boom frame, the hand rest cushion is attached to the boom frame and is located above the seat cushion.

10 Claims, 7 Drawing Sheets

(56) References Cited

U.S. PATENT DOCUMENTS

| | | | | | |
|---|---|---|---|---|---|
| 5,892,180 | A * | 4/1999 | Carey | A61G 7/1096 177/144 |
| 6,201,195 | B1 * | 3/2001 | Carey | A61G 7/1094 177/144 |
| 6,857,144 | B1 * | 2/2005 | Huang | A61G 7/1017 5/81.1 R |
| 7,428,759 | B2 * | 9/2008 | Bain | A61G 7/1046 254/8 R |
| 7,647,655 | B2 * | 1/2010 | Liljedahl | A61G 7/109 5/81.1 R |
| 8,650,077 | B2 * | 2/2014 | Antonucci | G06Q 20/20 705/16 |
| 9,009,886 | B2 * | 4/2015 | Hjort | A61G 7/1092 5/83.1 |
| 9,254,232 | B2 * | 2/2016 | Hjort | A61G 7/1096 |
| 9,295,597 | B2 * | 3/2016 | Hjort | A61G 7/1092 |
| 9,398,995 | B2 * | 7/2016 | Tekulve | A63B 22/00 |
| 10,206,847 | B1 * | 2/2019 | Tekulve | A63B 69/0064 |
| 11,219,568 | B2 * | 1/2022 | Yuh | A61G 7/1019 |
| 2006/0045709 | A1 * | 3/2006 | Bain | B66C 23/48 414/626 |
| 2009/0119835 | A1 * | 5/2009 | Liljedahl | A61G 7/109 5/89.1 |
| 2011/0056019 | A1 * | 3/2011 | Altena | A61G 7/1053 5/87.1 |
| 2014/0289958 | A1 * | 10/2014 | Hjort | A61G 7/1096 5/83.1 |
| 2014/0289959 | A1 * | 10/2014 | Hjort | A61G 5/14 5/83.1 |
| 2014/0289960 | A1 * | 10/2014 | Hjort | A61G 7/1019 5/83.1 |
| 2015/0099614 | A1 * | 4/2015 | Tekulve | A61H 3/04 482/139 |
| 2016/0166451 | A1 * | 6/2016 | Tekulve | A61G 7/1046 297/5 |
| 2017/0333745 | A1 * | 11/2017 | Tekulve | A63B 21/0552 |
| 2019/0133859 | A1 * | 5/2019 | Yuh | A61G 7/1017 |

FOREIGN PATENT DOCUMENTS

| | | | | | |
|---|---|---|---|---|---|
| EP | 0695159 | B1 * | 3/1997 | A61G 7/1017 |
| EP | 2783670 | A1 * | 10/2014 | A61G 7/1019 |
| EP | 2783671 | A1 * | 10/2014 | A61G 7/1019 |
| EP | 2783671 | B1 * | 2/2016 | A61G 7/1092 |
| EP | 2783670 | B1 * | 6/2016 | A61G 7/1092 |
| GB | 2177063 | A * | 1/1987 | A61G 7/1051 |
| GB | 2182633 | A * | 5/1987 | A61G 7/1096 |
| GB | 2177063 | B * | 9/1988 | A61G 7/1051 |
| GB | 2277302 | A * | 10/1994 | A61G 7/1046 |
| WO | WO-9424979 | A1 * | 11/1994 | A61G 7/1046 |
| WO | WO-2006091143 | A1 * | 8/2006 | A61G 7/10 |
| WO | WO-2014154687 | A2 * | 10/2014 | A61G 7/1019 |
| WO | WO-2016064868 | A1 * | 4/2016 | A63B 21/40 |

* cited by examiner

MOVING MACHINE

1. TECHNICAL FIELD

The invention relates to the technical field of medical equipment, in particular to a moving machine.

2. BACKGROUND ART

Moving machine is a kind of medical equipment to help solve the problem of mobility impaired people in mutual displacement between wheelchair and sofa, bed, toilet, seat, etc., as well as toileting, bathing and other series of life problems, widely used in hospitals, nursing homes, rehabilitation centers, homes and other places. Among the existing moving machines, most of their structures are fixed and difficult to adjust, with poor adaptability, difficult to adapt to different needs of different users, and more trouble to use.

3. SUMMARY OF THE INVENTION

An object of the present invention is to provide a moving machine, aiming at solving the problems of poor adaptability and inconvenient use in existing moving machines.

In order to realize the above object, the invention adopts the following technical solution:

to provide a moving machine, comprising:

a base;

a support component, the support component comprising a support column and a support frame, wherein the support column is connected to the base, and the support frame is connected to the support column;

boom components, there are two boom components, and two boom components are symmetrically disposed on the support frame; each boom component comprises a boom frame, a boom locking member, a seat cushion and a hand rest cushion; the boom frame is rotatably connected to the support frame, the boom locking member is movably connected to the boom frame, the boom locking member is used to restrict movement of the boom frame relative to the support frame, the seat cushion is connected to the boom frame, the hand rest cushion is attached to the boom frame and is located above the seat cushion.

Optionally, the moving machine further comprises a chest component; the chest component comprises a chest connecting member, a chest locking member and a chest cushion; the chest connecting member is movably connected to the support frame, the chest locking member is movably connected to the chest connecting member, the chest locking member is used for restricting the chest connecting member from movement relative to the support frame, and the chest cushion is disposed on the chest connecting member.

Optionally, the moving machine further comprises a knee component; the knee component comprises a knee support tube, knee connecting members, knee locking members, knee cushions and a knee adjusting member; the knee adjusting member is connected to the support column, the knee support tube is connected to the knee adjusting members, the knee connecting members are movably connected to the knee support tube, and the knee locking members are movably connected to the knee connecting members; the knee locking members are used for restricting movement of the knee connecting members relative to the knee support tube, and the knee cushions are provided on the knee connecting members.

Optionally, the moving machine further comprises an arm-rest frame, which is movably connected to the support column.

Optionally, the support component further comprises a support adjusting member and a support locking member; the support adjusting member is capable of moving up and down relative to the support column, and the support locking member is movably connected to the support adjusting member; the support locking member is used to restrict movement of the support adjusting member relative to the support column, and the support frame is connected to the support adjusting member.

Optionally, the support adjusting member is provided with support adjusting holes, the support column is provided with a plurality of support locking holes, a plurality of the support locking holes are provided at intervals along vertical direction of the support column, and the support locking member is capable of penetrating the support adjusting holes and the support locking holes in sequence.

Optionally, each boom component further comprises a position adjusting member and a position locking member; the position adjusting member is capable of moving upward and downward relative to the boom frame, and the position locking member is movably connected to the position adjusting member; the position locking members are used to restrict movement of the position adjusting members relative to the boom frames, and the seat cushions are connected to the position adjusting members.

Optionally, the position adjusting member is provided with a position adjusting hole, the boom frame is provided with a plurality of position locking holes, a plurality of the position locking holes are provided spaced apart in vertical direction of the boom frame, and the position locking member is capable of penetrating the position adjusting hole and the position locking hole in sequence.

Optionally, the moving machine further comprises an angle adjusting component; the angle adjusting component comprises a first adjusting lever, a second adjusting lever, a first linkage lever, a second linkage lever, a linkage piece and angle adjusting plates; the first adjusting lever and the second adjusting lever are disposed on both sides of the base and are rotatably connected to the base, the linkage piece is rotatably connected to the base and the linkage piece is disposed between the first adjusting lever and the second adjusting lever; one end of the first linkage lever is rotatably connected to the first adjusting lever, an other end of the first linkage lever is rotatably connected to a lower end of the linkage piece, one end of the second linkage lever is rotatably connected to the second adjusting lever, an other end of the second linkage lever is rotatably connected to an upper end of the linkage piece, and the angle adjusting plates are connected to an upper end of the linkage piece.

Optionally, the moving machine further comprises moving wheels, a foot mat, a pedal, and a foot support plate; the first adjusting lever and the second adjusting lever are provided with moving wheels, the foot support plate is connected to the base, the pedal is connected to the foot support plate, and the foot mat is provided on the pedal.

Compared with the prior art, the advantageous effects of the invention are as follows:

1. In the moving machine provided by the invention, a boom component is provided, the boom components are symmetrically disposed on the support frame; each boom component comprises a boom frame, a boom locking member, a seat cushion and a hand rest cushion; when in use, the user can sit on the seat cushions and then lie down on the whole moving machine, with both hands resting on the hand rest cushions; when not in need of use, the boom locking members can be released, and the whole boom frames can be rotated outward to open the whole space, the user can then leave the moving machine; compared with some existing moving machines that can only open the space at the seat cushion, the present invention's boom components opens a larger space, so that the user can leave the moving machine more conveniently and easily, which is more convenient to use; and the boom components can be adjusted by moving upward and downward and by moving left and right, so that it can be adapted to the different use requirements, and the adaptability is better.

2. In the moving machine provided in this invention, the chest component is provided, the chest cushion can let the user lie on the moving machine more comfortably, the chest cushion can rotate and move left and right relative to the support frame, and the chest cushion can also move up and down relative to the support column, so as to adapt to the different postures of different users, with better adaptability, easier to use, and a better experience for the user.
3. In the moving machine provided by the invention, the knee component is provided, when the user lies on the moving machine, the knee cushions can provide a good support for the user's knees and a more comfortable feeling, the knee cushions can rotate, move up and down and move left and right relative to the support column, thereby adapting to the different postures of different users, with better adaptability, more convenient use, and a better experience for the user.

4. BRIEF DESCRIPTION OF ACCOMPANY DRAWINGS

In order to illustrate the preferred embodiment of the invention more clearly, the technical scheme of the preferred embodiment or the figures required by the prior art is further described briefly. Obviously, only partial embodiments of the invention are shown and the actual structure is not limited thereto. It is to be understood by those skilled in the art that other drawings can be obtained based on the drawings of the invention with non-creative labor.

As shown in the accompanying drawings: 1 base, 2 support component, 21 support column, 22 support frame, 23 support adjusting member, 24 support adjusting hole, 25 support locking hole, 3 boom component, 31 boom frame, 32 boom locking member, 33 seat cushion, 34 hand rest cushion, 35 rotating shaft, 36 position adjusting member, 37 position locking member, 38 position locking hole, 4 chest component, 41 chest connecting member, 42 chest locking member, 43 chest cushion, 5 knee component, 51 knee support tube, 52 knee connecting member, 53 knee locking member, 54 knee cushion, 55 knee adjusting member, 6 arm-rest frame, 7 angle adjusting component, 71 first adjusting lever, 72 second adjusting lever, 73 first linkage lever, 74 second linkage lever, 75 linkage piece, 76 angle adjusting plate, 8 moving wheel, 9 foot mat, 10 pedal.

5. SPECIFIC EMBODIMENT OF THE INVENTION

The technical scheme of the invention is further described clearly and detailedly hereinafter with reference to the drawings. Obviously, only partial embodiments of the invention are shown and the actual structure is not limited thereto. All other embodiments, which can be obtained by those skilled in the art without making any creative effort based on the embodiments in the present invention, shall all fall within the protective scope of the invention.

In the description of the invention, it is to be understood that the terms "length", "width", "up", "down", "front", "back", "left", "right", "vertical", "horizontal", "top", "bottom", "inside", "outside", and the like indicate orientation or positional relationships based on those shown in the accompanying drawings, solely for the purpose of facilitating the description of the invention and simplifying the description and are not intended to indicate or imply that the device or element referred to must have a particular orientation, be constructed and operated in a particular orientation, and therefore are not to be construed as limitations of the invention.

Furthermore, the terms "first" and "second" are used for descriptive purposes only and are not to be understood as indicating or implying relative importance or implicitly specifying the number of technical features indicated. Thus, a feature defined with the terms "first" and "second" may expressly or implicitly include one or more such features.

Figure 1:
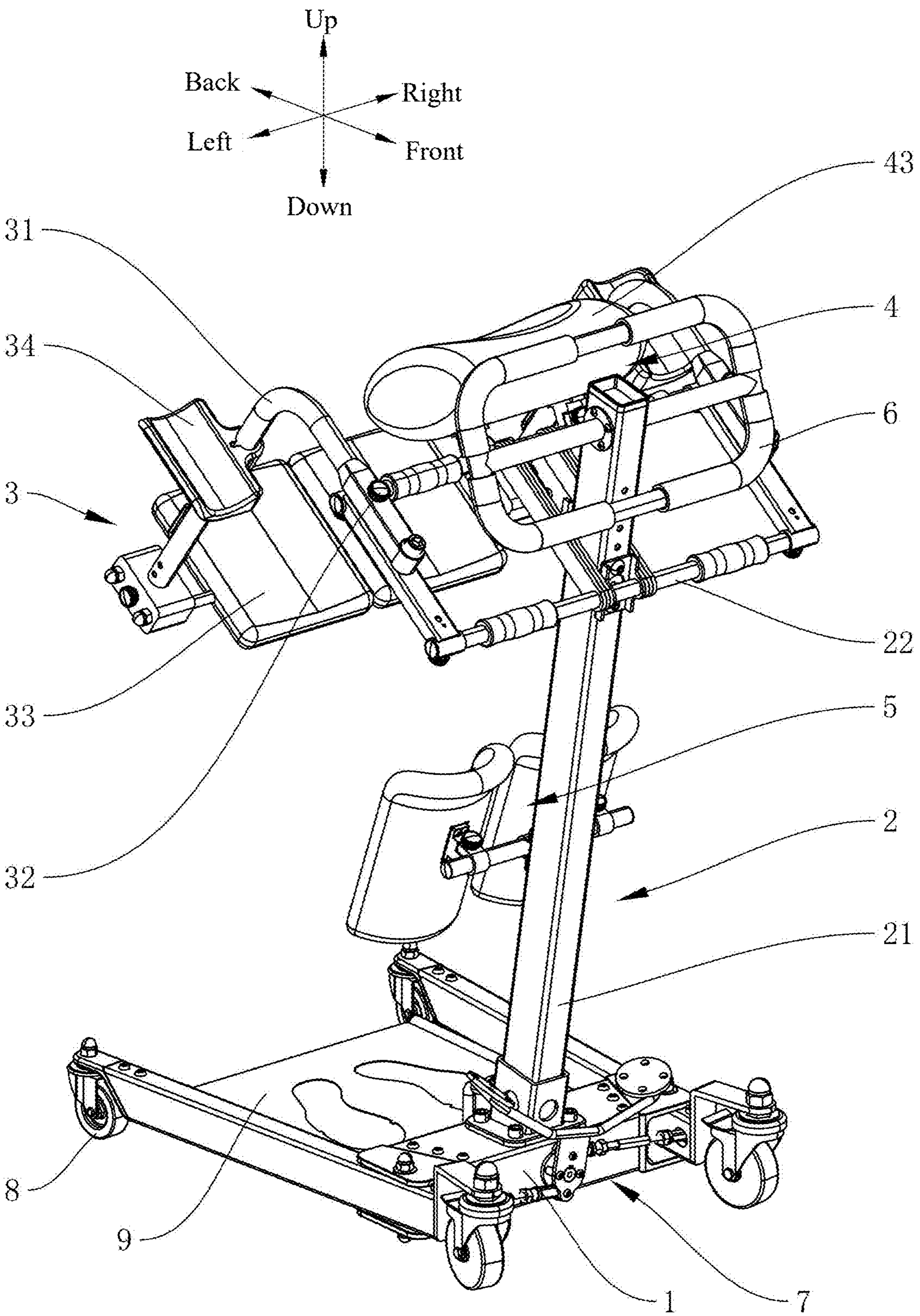
FIG. 1 is a structural diagram of the moving machine provided by the invention.
Figure 2:
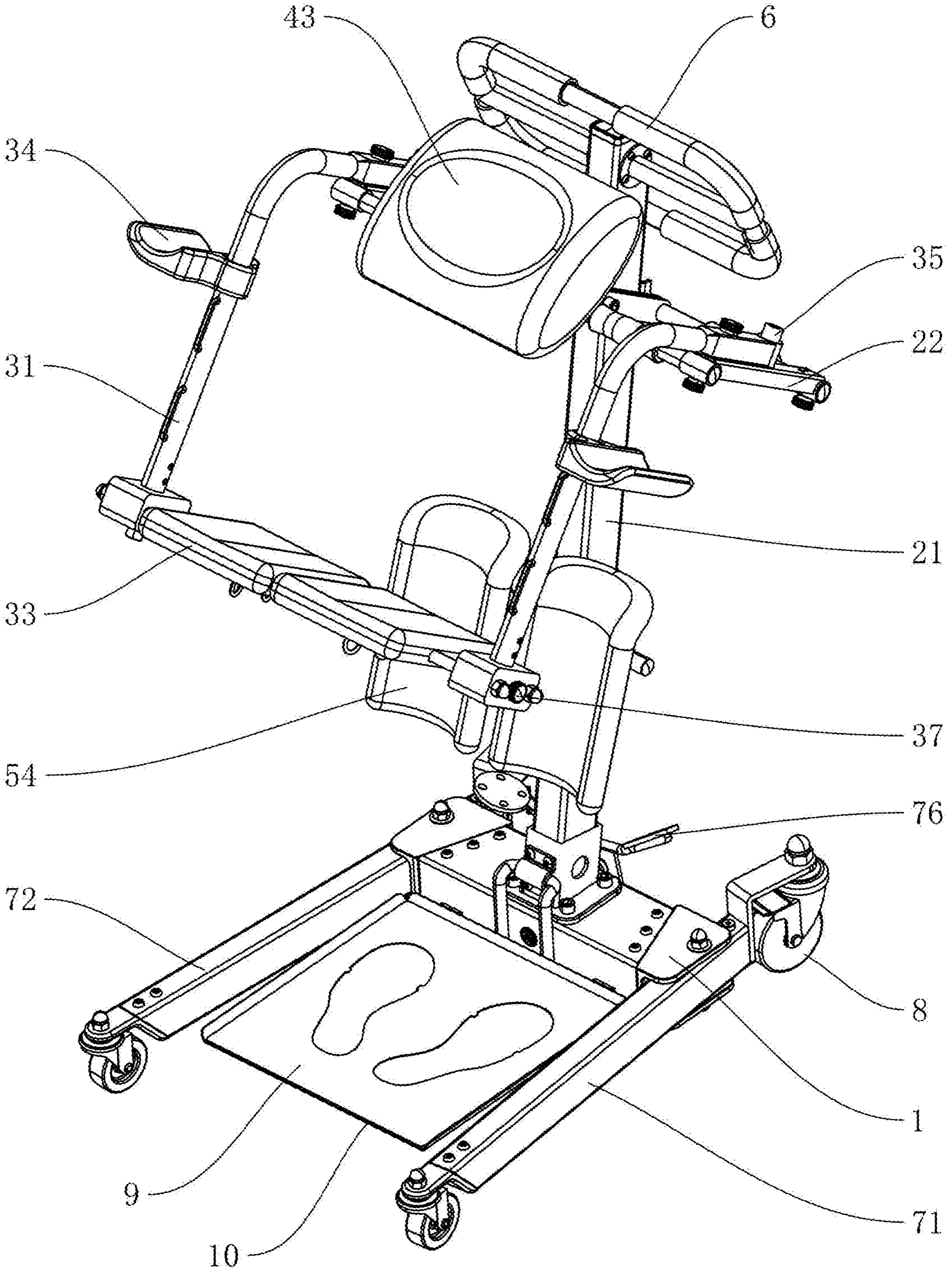
FIG. 2 is a structural diagram of the moving machine from another angle provided by the invention.
Figure 3:
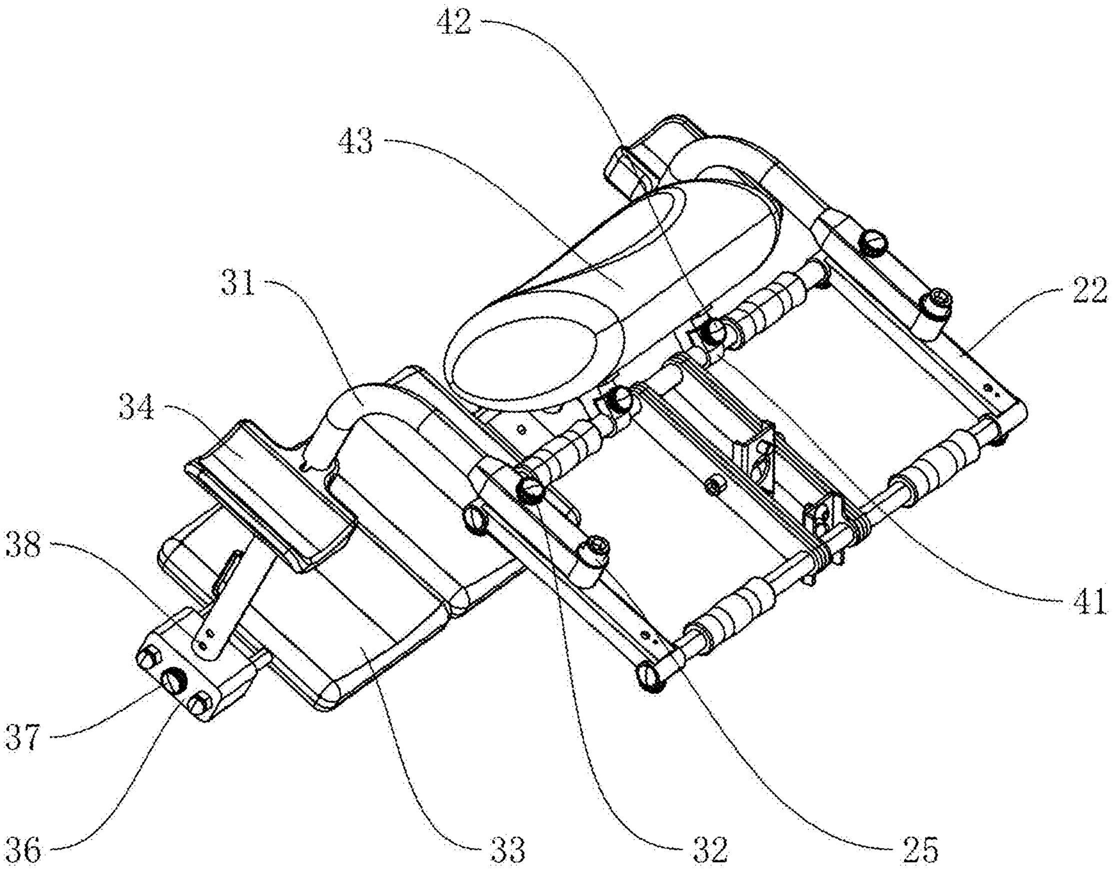
FIG. 3 is a structural diagram of the boom component, chest component and support frame of the moving machine provided by the invention.
Figure 4:
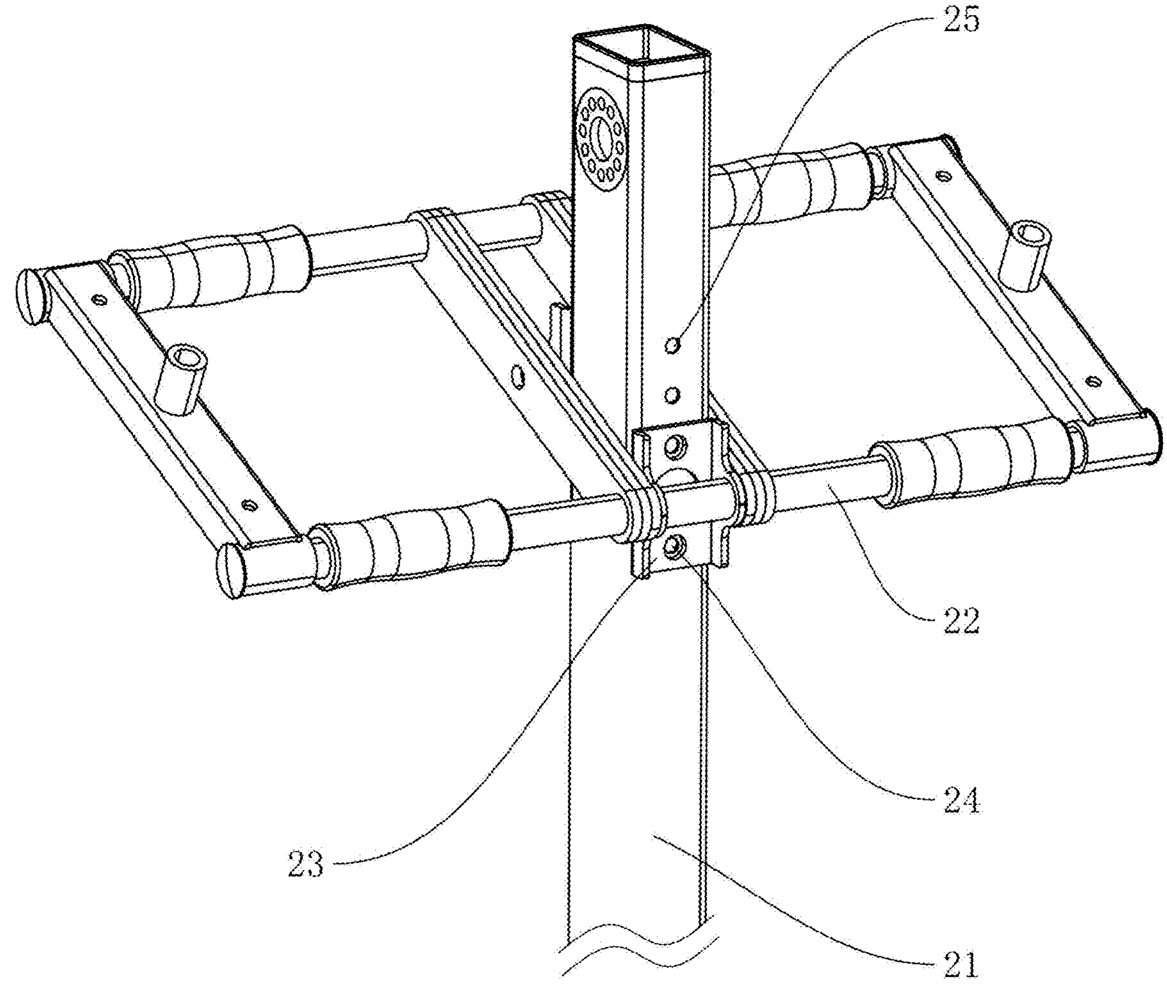
FIG. 4 is a structural diagram of the support component of the moving machine provided by the invention.
Figure 5:
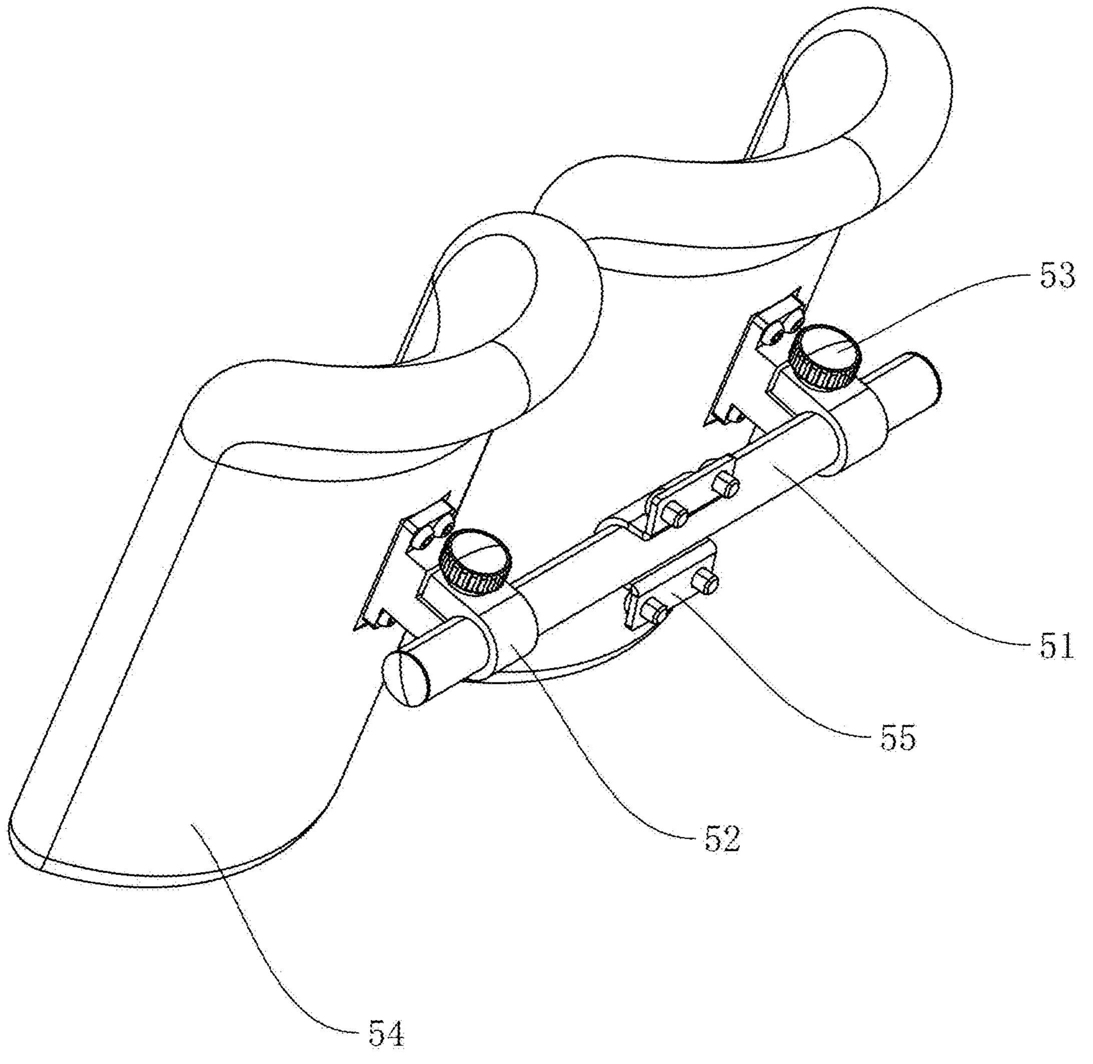
FIG. 5 is a structural diagram of the knee component of the moving machine provided by the invention.
Figure 6:
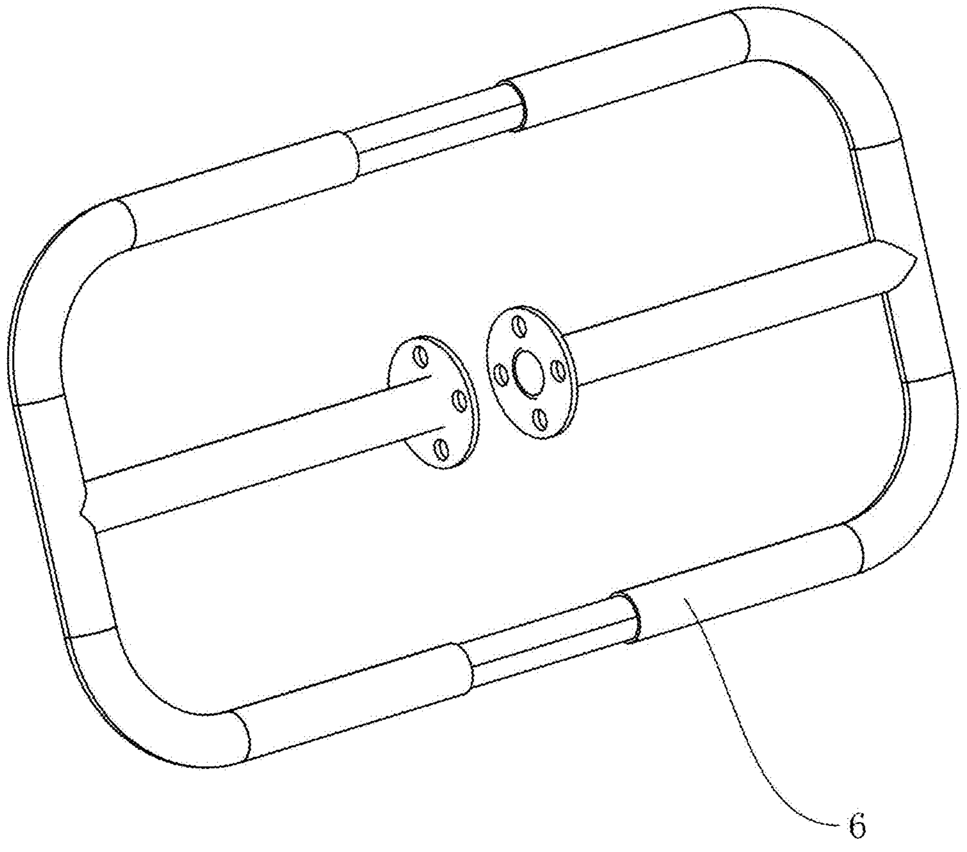
FIG. 6 is a structural diagram of the arm-rest frame of the moving machine provided by the invention.
Figure 7:
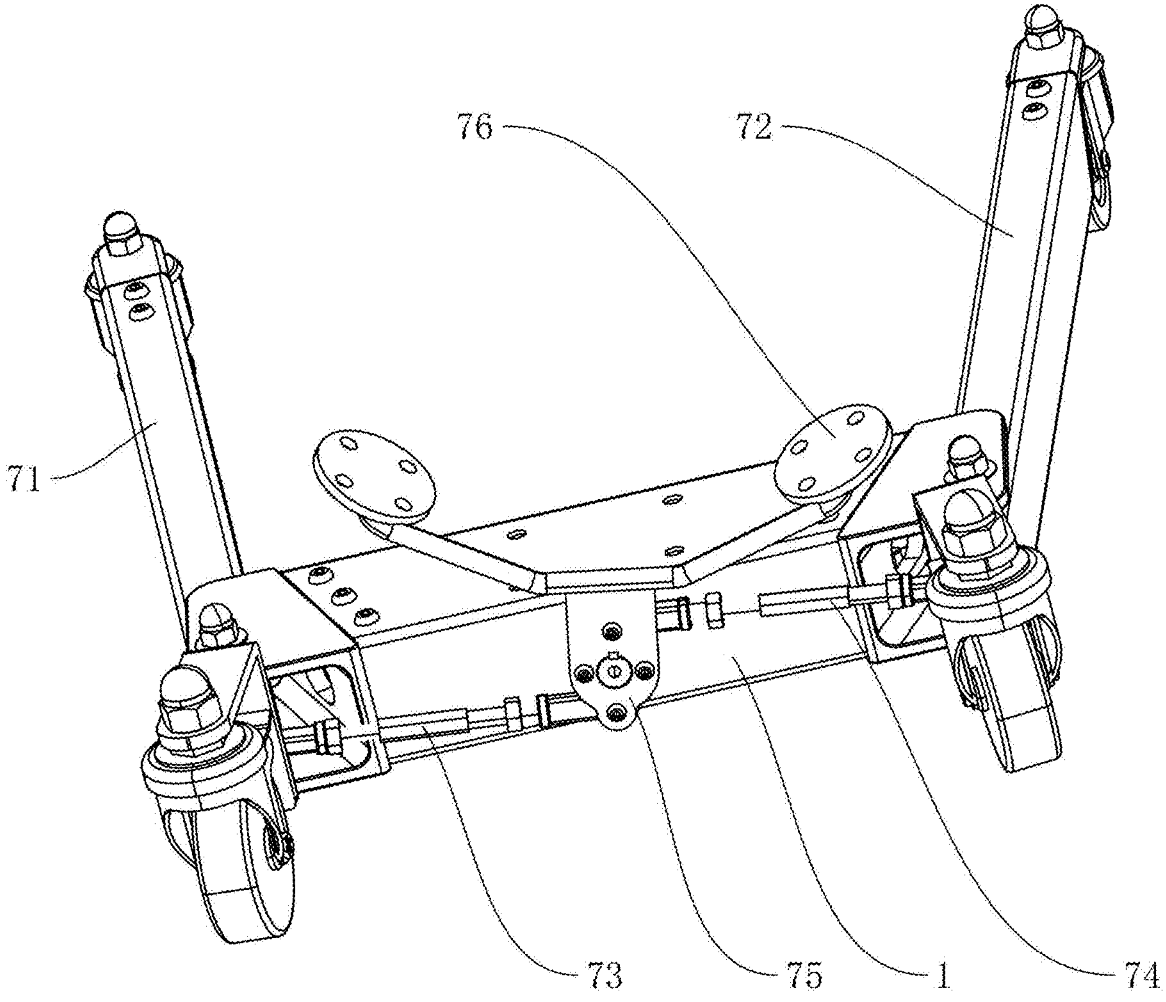
FIG. 7 is a structural diagram of the angle adjusting component of the moving machine provided by the invention.

A moving machine provided by the invention is further described in detail hereinafter with reference from FIG. 1 to FIG. 7.

As shown from FIG. 1 to FIG. 7, the invention provides a moving machine, comprising a base 1, a support component 2, and boom components 3; the support component 2 comprises a support column 21 and a support frame 22, wherein the support column 21 is connected to the base 1, and the support frame 22 is connected to the support column 21; there are two boom components 3, and two boom components 3 are symmetrically disposed on the support frame 22; each boom component 3 comprises a boom frame 31, a boom locking member 32, a seat cushion 33 and a hand rest cushion 34; when in use, the user can sit on the seat cushions 33, with the chest resting on the chest component 4, and then lie down on the whole moving machine, with both hands resting on the hand rest cushions 34; when not in need of use, the boom locking members 32 can be released, and the whole boom frames 31 can be rotated outward, that is to rotate to left and right sides, so as to open the whole space, the user can then leave the moving machine; compared with some existing moving machines that can only open the space at the seat cushion 33, the present invention's boom components 3 opens a larger space, so that the user can leave the moving machine more conveniently and easily, which is more convenient to use; and the boom components 3 can be adjusted by moving upward and downward and by moving left and right, so that it can be adapted to the different use requirements, and the adaptability is better.

Specifically, the support column 21 is tilted forward at a certain angle, and the support frame 22 is also tiltedly disposed on the support column 21, so that the user can lie on the moving machine more comfortably.

In some embodiments, the boom frame 31 is L-shaped, one end of the boom frame 31 is rotatably connected to the support frame 22 via the rotating shaft 35, and the boom locking member 32 is disposed in the vicinity of the rotating shaft 35, so as to be able to lock the boom frame 31, and prevent the boom frame 31 from rotating in normal use, and provide higher safety.

In some embodiments, the support frame 22 is provided with a corresponding boom locking hole, and the boom locking member 32 is able to pass through the boom frame 31 and the boom locking hole in turn, so as to stably fix the boom frame 31 on the support frame 22, which is able to better lock the boom frame 31 and prevent the boom frame 31 from rotating, and is more secure.

In some embodiments, the boom locking member 32 is a commonly used knob with a stud, and the boom locking hole is an adapted threaded hole, which is more convenient to use.

In some embodiments, the moving machine further comprises a chest component 4; the chest component 4 comprises a chest connecting member 41, a chest locking member 42 and a chest cushion 43; the chest connecting member 41 is movably connected to the support frame 22, the chest locking member 42 is movably connected to the chest connecting member 41, the chest locking member 42 is used for restricting the chest connecting member 41 from movement relative to the support frame 22, and the chest cushion 43 is disposed on the chest connecting member 41.

Specifically, the chest cushion 43 can let the user lie on the moving machine more comfortably, the chest cushion 43 can rotate and move left and right relative to the support frame 22, and the chest cushion 43 can also move up and down relative to the support column 21, so as to adapt to the different postures of different users, with better adaptability, easier to use, and a better experience for the user.

More specifically, the chest connecting member 41 is U-shaped and can be sleeved on the support frame 22, the chest locking member 42 is a commonly used knob with a stud, the chest connecting member 41 is provided with two chest locking holes, and the chest locking holes are threaded holes to be adapted to each other, and by rotating the chest locking member 42, it is possible to make the chest connecting member 41 more tightly clamped to the support frame 22, thus completing the fixation and making it more convenient to use.

In some embodiments, the moving machine further comprises a knee component 5; the knee component 5 comprises a knee support tube 51, knee connecting members 52, knee locking members 53, knee cushions 54 and a knee adjusting member 55; the knee adjusting member 55 is connected to the support column 21, the knee support tube 51 is connected to the knee adjusting member 55, the knee connecting members 52 are movably connected to the knee support tube 51, and the knee locking members 53 are movably connected to the knee connecting members 52; the knee locking members 53 are used for restricting movement of the knee connecting members 52 relative to the knee support tube 51, and the knee cushions 54 are provided on the knee connecting members 52.

Specifically, the position of the knee cushions 54 in the vertical direction can be adjusted by changing the position of the knee adjusting members 55. when the user lies on the moving machine, the knee cushions 54 can provide a good support for the user's knees and a more comfortable feeling, the knee cushions 54 can rotate, move up and down and move left and right relative to the support column 21, thereby adapting to the different postures of different users, with better adaptability, more convenient use, and a better experience for the user.

More specifically, the knee connecting members 52 are U-shaped shape and can be sleeved on the support frame 22; the knee locking member 53 is a commonly used knob with a stud, the knee connecting member 52 is provided with two knee locking holes, and the knee locking holes are threaded holes to be adapted to each other, and by rotating the knee locking member 53, it is possible make the knee connecting member 52 to be more tightly clamped o the knee support tube 51, thus completing the fixation and making it more convenient to use.

In some embodiments, the moving machine further comprises an arm-rest frame 6, which is movably connected to the support column 21. When the user lies down on the moving machine, both hands can grasp the arm-rest frame 6, with a better experience.

Specifically, the arm-rest frame 6 and the support column 21 are provided with a plurality of corresponding threaded holes, and when the arm-rest frame 6 is rotated to a suitable angle, it can be bolted to the support column 21, which provides better stability and higher safety when in use.

In some embodiments, the support component 2 further comprises a support adjusting member 23 and a support locking member; the support adjusting member 23 is capable of moving up and down relative to the support column 21, and the support locking member is movably connected to the support adjusting member 23; the support locking member is used to restrict movement of the support adjusting member 23 relative to the support column 21, and the support frame 22 is connected to the support adjusting member 23; specifically, by providing the support adjusting member 23 and the support locking member, the position of the support frame 22 on the support column 21 can be adjusted, so as to be able to adapt to users of different body sizes, with better adaptability, more convenient use, and a better sense of user experience.

In some embodiments, the support adjusting member 23 is provided with support adjusting holes 24, the support column 21 is provided with a plurality of support locking holes 25, a plurality of the support locking holes 25 are provided at intervals along a vertical direction of the support column 21, and the support locking member is capable of penetrating the support adjusting holes 24 and the support locking holes 25 in sequence, so that the position of the support frame 22 on the support column 21 can be adjusted more conveniently, and the adjustment is more convenient.

It will be appreciated that by providing the support component 2 which can be adjusted in position, the position of the boom component 3 and the chest component 4 in the vertical direction can thus be adjusted, and the adjustment is more convenient.

In some embodiments, the support locking member is a commonly used knob with a stud, and the support locking holes 25 are adapted threaded holes, which is more convenient to use.

In some embodiments, each boom component 3 further comprises a position adjusting member 36 and a position locking member 37; the position adjusting member 37 is capable of moving upward and downward relative to the boom frame 31, and the position locking member 37 is movably connected to the position adjusting member 36; the position locking members 37 are used to restrict movement of the position adjusting members 36 relative to the boom frames 31, and the seat cushions 33 are connected to the position adjusting members 36; specifically, by providing the position adjusting member 36 and the position locking member 37, the position of the seat cushions 33 on the boom frames 31 can be adjusted so that it can be adapted to users with different body shapes, with better adaptability, more convenient use, and a better sense of user experience.

In some embodiments, the position adjusting member 36 is provided with a position adjusting hole, the boom frame 31 is provided with a plurality of position locking holes 38, a plurality of the position locking holes 38 are provided spaced apart in vertical direction of the boom frame 31, and the position locking member 37 is capable of penetrating the position adjusting hole and the position locking hole 38 in sequence, so that the position of the seat cushions 33 on the boom frames 31 can be adjusted more easily, and the adjustment is more convenient.

In some embodiments, the position locking member 37 is a commonly used knob with a stud, and the position locking holes 38 are adapted threaded holes, which is more convenient to use.

In some embodiments, the moving machine further comprises an angle adjusting component 7; the angle adjusting component 7 comprises a first adjusting lever 71, a second adjusting lever 72, a first linkage lever 73, a second linkage lever 74, a linkage piece 75 and angle adjusting plates 76; the first adjusting lever 71 and the second adjusting lever 72 are disposed on both sides of the base 1 and are rotatably connected to the base 1, the linkage piece 75 is rotatably connected to the base 1 and the linkage piece 75 is disposed between the first adjusting lever 71 and the second adjusting lever 72; one end of the first linkage lever 73 is rotatably connected to the first adjusting lever 71, an other end of the first linkage lever 73 is rotatably connected to a lower end of the linkage piece 75, one end of the second linkage lever 74 is rotatably connected to the second adjusting lever 72, an other end of the second linkage lever 74 is rotatably connected to an upper end of the linkage piece 75, and the angle adjusting plates 76 are connected to the upper end of the linkage piece 75; specifically, when it is necessary to adjust the structure of the first adjusting lever 71 and the second adjusting lever 72, the angle adjusting plates 76 can be stepped on to adjust, if the angle is to be made larger, a left side of the angle adjusting plate 76 is stepped on, the first adjusting lever 71 and the second adjusting lever 72 will be rotated outward under the linkage of the first linkage lever 73, the second linkage lever 74, and linkage piece 75; if the angle is to be made smaller, then step on a right side of the angle adjusting plate 76, the first adjusting lever 71 and the second adjusting lever 72 will be rotated inward under the linkage of the first linkage lever 73, the second linkage lever 74 and linkage piece 75. To make the angle smaller, step on the right side of the angle adjusting plate 76, which is more convenient to adjust.

In some embodiments, the moving machine further comprises moving wheels 8, a foot mat 9, a pedal 10, and a foot support plate; the first adjusting lever 71 and the second adjusting lever 72 are provided with moving wheels 8, the foot support plate is connected to the base 1, the pedal 10 is connected to the foot support plate, and the foot mat 9 is provided on the pedal 10; the foot mat 9 improves anti-slip performance and safety.

The invention and its embodiments have been described above, but the description is not limited thereto; only one embodiment of the invention is shown in the drawings, and the actual structure is not limited thereto. In general, it is to be understood by those skilled in the art that non-creative design of structural forms and embodiments that are similar to the technical solutions without departing from the spirit of the invention shall all fall within the protective scope of the invention.

The invention claimed is:

1. A moving machine, comprising:

a base;

a support component, the support component comprising a support column and a support frame, wherein the support column is connected to the base, and the support frame is connected to the support column;

boom components, there are two boom components, and the two boom components are symmetrically disposed on the support frame; each boom component comprises a boom frame, a boom locking member, a seat cushion and a hand rest cushion; the boom frame is rotatably connected to the support frame, the boom locking member is movably connected to the boom frame, the boom locking member is used to restrict movement of the boom frame relative to the support frame, the seat cushion is connected to the boom frame, the hand rest cushion is attached to the boom frame and is located above the seat cushion.

2. The moving machine of claim 1, wherein the moving machine further comprises a chest component; the chest component comprises a chest connecting member, a chest locking member and a chest cushion; the chest connecting member is movably connected to the support frame, the chest locking member is movably connected to the chest connecting member, the chest locking member is used for restricting the chest connecting member from movement relative to the support frame, and the chest cushion is disposed on the chest connecting member.

3. The moving machine of claim 1, wherein the moving machine further comprises a knee component; the knee component comprises a knee support tube, knee connecting members, knee locking members, knee cushions and a knee adjusting member; the knee adjusting member is connected to the support column, the knee support tube is connected to the knee adjusting member, the knee connecting members are movably connected to the knee support tube, and the knee locking members are movably connected to the knee connecting members; the knee locking members are used for restricting movement of the knee connecting members relative to the knee support tube, and the knee cushions are provided on the knee connecting members.

4. The moving machine of claim 1, wherein the moving machine further comprises an arm-rest frame, which is movably connected to the support column.

5. The moving machine of claim 1, wherein the support component further comprises a support adjusting member and a support locking member; the support adjusting member is capable of moving up and down relative to the support column, and the support locking member is movably connected to the support adjusting member; the support locking member is used to restrict movement of the support adjusting member relative to the support column, and the support frame is connected to the support adjusting member.

6. The moving machine of claim 5, wherein the support adjusting member is provided with support adjusting holes, the support column is provided with a plurality of support locking holes, a plurality of the support locking holes are provided at intervals along a vertical direction of the support column, and the support locking member is capable of penetrating the support adjusting holes and the support locking holes in sequence.

7. The moving machine of claim 1, wherein each boom component further comprises a position adjusting member and a position locking member; the position adjusting member is capable of moving upward and downward relative to the boom frame, and the position locking member is movably connected to the position adjusting member; the position locking members are used to restrict movement of the position adjusting members relative to the boom frames, and the seat cushions are connected to the position adjusting members.

8. The moving machine of claim 7, wherein the position adjusting member is provided with a position adjusting hole, the boom frame is provided with a plurality of position locking holes, a plurality of the position locking holes are provided spaced apart in vertical direction of the boom frame, and the position locking member is capable of penetrating the position adjusting hole and the position locking hole in sequence.

9. The moving machine of claim 1, wherein the moving machine further comprises an angle adjusting component; the angle adjusting component comprises a first adjusting lever, a second adjusting lever, a first linkage lever, a second linkage lever, a linkage piece and angle adjusting plates; the first adjusting lever and the second adjusting lever are disposed on both sides of the base and are rotatably connected to the base, the linkage piece is rotatably connected to the base and the linkage piece is disposed between the first adjusting lever and the second adjusting lever; one end of the first linkage lever is rotatably connected to the first adjusting lever, an other end of the first linkage lever is rotatably connected to a lower end of the linkage piece, one end of the second linkage lever is rotatably connected to the second adjusting lever, an other end of the second linkage lever is rotatably connected to an upper end of the linkage piece, and the angle adjusting plates are connected to the upper end of the linkage piece.

10. The moving machine of claim 9, wherein the moving machine further comprises moving wheels, a foot mat, a pedal, and a foot support plate; the first adjusting lever and the second adjusting lever are provided with moving wheels, the foot support plate is connected to the base, the pedal is connected to the foot support plate, and the foot mat is provided on the pedal.

* * * * *